United States Patent
Hu et al.

(10) Patent No.: US 11,303,566 B2
(45) Date of Patent: Apr. 12, 2022

(54) METHOD, ELECTRONIC DEVICE, AND COMPUTER PROGRAM PRODUCT FOR DATA PROCESSING

(71) Applicant: EMC IP Holding Company LLC, Hopkinton, MA (US)

(72) Inventors: Chenxi Hu, Beijing (CN); Shixu Dong, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 9 days.

(21) Appl. No.: 16/850,479

(22) Filed: Apr. 16, 2020

(65) Prior Publication Data
US 2021/0306264 A1  Sep. 30, 2021

(30) Foreign Application Priority Data
Mar. 26, 2020 (CN) .......................... 202010222759.X (51) Int. Cl.
*H04L 45/74* (2022.01)
*H04L 69/22* (2022.01)

(52) U.S. Cl.
CPC .............. *H04L 45/74* (2013.01); *H04L 69/22* (2013.01); *H04L 2212/00* (2013.01)

(58) Field of Classification Search
CPC ..... H04L 45/74; H04L 69/22; H04L 2212/00; H04L 45/745; H04L 69/08
See application file for complete search history.

(56) References Cited

U.S. PATENT DOCUMENTS

| 6,847,645 B1 * | 1/2005 | Potter | H04L 45/00 370/392 |
| 2006/0013255 A1 * | 1/2006 | Kuskin | H04L 1/0083 370/473 |
| 2018/0063297 A1 * | 3/2018 | Chu | H04L 69/22 |
| 2018/0083884 A1 * | 3/2018 | Kuang | H04L 49/9005 |

(Continued)

FOREIGN PATENT DOCUMENTS

WO  WO-2015007099 A1 *  1/2015  ........... H04L 1/0083

OTHER PUBLICATIONS

H. Kang, "P4 based Programmable Data Plane," Barefoot Networks, Oct. 2018, 30 pages.

(Continued)

*Primary Examiner* — Khaled M Kassim
*Assistant Examiner* — Kai Chang
(74) *Attorney, Agent, or Firm* — Ryan, Mason & Lewis, LLP (57) ABSTRACT

Embodiments of the present disclosure relate to a method, a device, and a computer program product for data processing. The method comprises determining information associated with an attribute of a data packet from a source device; determining, based on the information, a target operation to be performed on the data packet; performing the target operation on the data packet; and causing the data packet on which the target operation has been performed to be sent to a target device of the data packet. In this manner, by using advantages of programmable switches, encapsulation and decapsulation operations are introduced for communications between edge Internet of Things network devices and data center applications, which can significantly increase the throughput.

20 Claims, 6 Drawing Sheets

(56) References Cited

U.S. PATENT DOCUMENTS

| | | | |
|---|---|---|---|
| 2018/0123952 A1* | 5/2018 | Link | H04L 47/32 |
| 2018/0176037 A1* | 6/2018 | Maes | H04L 43/04 |
| 2019/0312816 A1* | 10/2019 | Shen | H04L 47/26 |
| 2019/0373651 A1* | 12/2019 | Li | H04W 76/11 |
| 2020/0036610 A1* | 1/2020 | Indiresan | H04L 69/22 |
| 2020/0177503 A1* | 6/2020 | Hooda | H04L 45/64 |
| 2020/0344662 A1* | 10/2020 | Maino | H04W 28/0273 |
| 2020/0371692 A1* | 11/2020 | Van Doorn | G06F 12/0888 |

OTHER PUBLICATIONS

Barefoot Networks, "The World's Fastest & Most Programmable Networks," https://www.barefootnetworks.com/resources/worlds-fastest-most-programmable-networks/, Apr. 16, 2020, 10 pages.

\* cited by examiner

METHOD, ELECTRONIC DEVICE, AND COMPUTER PROGRAM PRODUCT FOR DATA PROCESSING

RELATED APPLICATION(S)

The present application claims priority to Chinese Patent Application No. 202010222759.X, filed Mar. 26, 2020, and entitled "Method, Electronic Device, and Computer Program Product for Data Processing," which is incorporated by reference herein in its entirety.

FIELD

Embodiments of the present disclosure generally relate to the field of information technologies, and more particularly, to a method, an electronic device, and a computer program product for data processing.

BACKGROUND

The Internet of Things (abbreviated as IoT) can realize, through a variety of information sensors, real-time collection of any objects that need to be monitored or connected. Through various possible types of network access, ubiquitous connection between things and things and between things and people is realized, and intelligent perception, identification, and management of objects and processes are realized. The Internet of Things enables ordinary physical objects that are addressed independently to form an interconnected network.

In the Internet of things, a terminal device constantly generates small data packets which contain only a small amount of sensor information. A network device in the Internet of Things may collect these small data packets from the terminal device. The network device sends the collected data to a remote data center over a network, which then routes these small data packets to a target device. The transmission efficiency of billions of small data packets on the Internet is not high because of the low throughput of small data packets through network devices.

SUMMARY

Embodiments of the present disclosure relate to a method, an electronic device, and a computer program product for data processing.

In a first aspect of the embodiments of the present disclosure, a method for data processing is provided. The method comprises determining information associated with an attribute of a data packet from a source device; determining, based on the information, a target operation to be performed on the data packet; performing the target operation on the data packet; and causing the data packet on which the target operation has been performed to be sent to a target device of the data packet.

In a second aspect of the embodiments of the present disclosure, an electronic device is provided. The device comprises a processor; and a memory coupled with the processor and storing instructions for execution by the processor, wherein the instructions, when executed by the processor, cause the electronic device to perform actions, the actions comprising: determining information associated with an attribute of a data packet from a source device; determining, based on the information, a target operation to be performed on the data packet; performing the target operation on the data packet; and causing the data packet on which the target operation has been performed to be sent to a target device of the data packet.

In a third aspect of the present disclosure, there is provided a computer program product that is tangibly stored on a non-transitory computer-readable medium and contains machine-executable instructions, wherein the machine-executable instructions, when executed, cause a machine to perform steps of the method of the first aspect.

This Summary is provided to introduce the choice of concepts in a simplified form, which will be further described in the following Detailed Description. The Summary is neither intended to identify key features or major features of the present disclosure, nor intended to limit the scope of the present disclosure.

BRIEF DESCRIPTION OF THE DRAWINGS

Identical or corresponding numerals represent identical or corresponding parts in various drawings.

DETAILED DESCRIPTION

Hereinafter, various example embodiments of the present disclosure will be described in detail with reference to the accompanying drawings. It should be noted that these figures and description relate to example embodiments only. It should be noted that, from the subsequent description, it is easy to devise alternative embodiments of the structure and method disclosed here, and these alternative embodiments may be used without departing from the principles claimed by the present disclosure.

It should be appreciated that these example embodiments are given only for the purpose of enabling a person skilled in the art to better understand and then implement the present disclosure, instead of limiting the scope of the present disclosure in any way.

As used herein, the terms "comprising," "including," and similar terms should be understood as open-ended terms, i.e., "comprising/including, but not limited to." The term "based on" is "based at least in part on." The term "some embodiments" means "at least some embodiments;" and the term "another embodiment" means "at least one other embodiment." Relevant definitions of other terms will be given in the description below.

Figure 1:
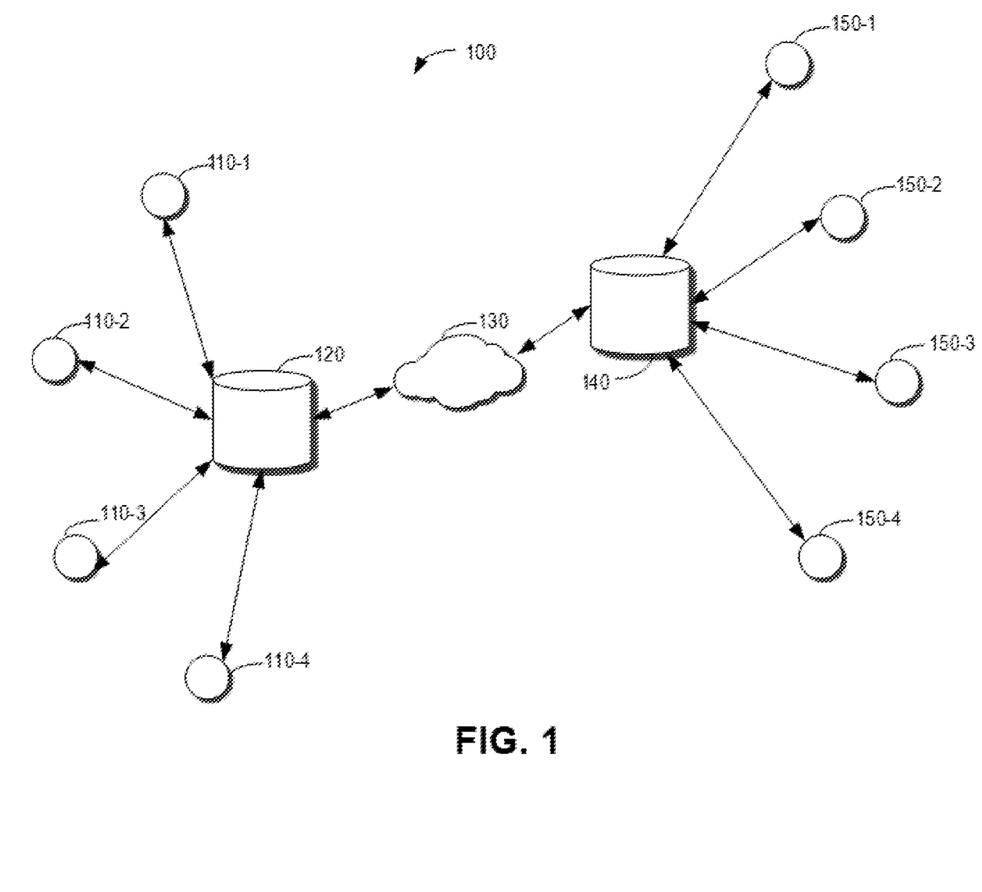
FIG. 1 shows a schematic diagram of an example running environment in which the embodiments of the present disclosure may be implemented.

FIG. 1 shows a schematic diagram of example running environment 100 in which the embodiments of the present disclosure may be implemented. As shown in FIG. 1, running environment 100 may comprise source terminal devices 110-1, 110-2, 110-3, and 110-4 (collectively referred to as source device 110 below). Source device 110 may be a terminal device used in the Internet of Things, such as an air conditioning controller, a smart lock, a traffic light, and a network camera. For example, source device 110 may be connected with first network device 120 and sends corresponding data collected by source device 110 to first network device 120. First network device 120 may be, for example, an Edge Switch.

First network device 120 may be sent to second network device 140 over network 130. Second network device 140 may be another switch at a remote data center. Running environment 100 may further comprise target terminal devices 150-1, 150-2, 150-3, and 150-4 (collectively referred to as target device 150 below). Target device 150 may be connected with second network device 140. Second network device 140 may acquire a source address and a target address in a data packet from network 130, and further route the data packet to target device 150 based on the target address.

It should be appreciated that FIG. 1 merely exemplarily shows source device 110 and target device 150 in running environment 100, and running environment 100 may comprise any number of source devices 110 and target devices 150. In addition, due to the bidirectional nature of data transmission, source device 110 may also be regarded as the target device in some scenarios, and target device 150 may also be regarded as the source device in some scenarios.

As described above, source device 110 in running environment 100 constantly generates small data packets which contain only a small amount of sensor information. These small data packets are sent to the remote data center through first network device 120. However, switching and routing of small data packets are inefficient on network devices. Therefore, degradation of performance in transmitting small data packets is inevitable.

Therefore, the embodiments of the present disclosure provide a method for data processing. The method can aggregate small data packets from a plurality of source devices into a large data packet. After the large data packet is transmitted to a remote device, the large data packet can be split into small data packets again to send these small data packets to the target device. In this manner, the throughput from an Internet of Things terminal device to a data processing center can be significantly increased.

Figure 2:
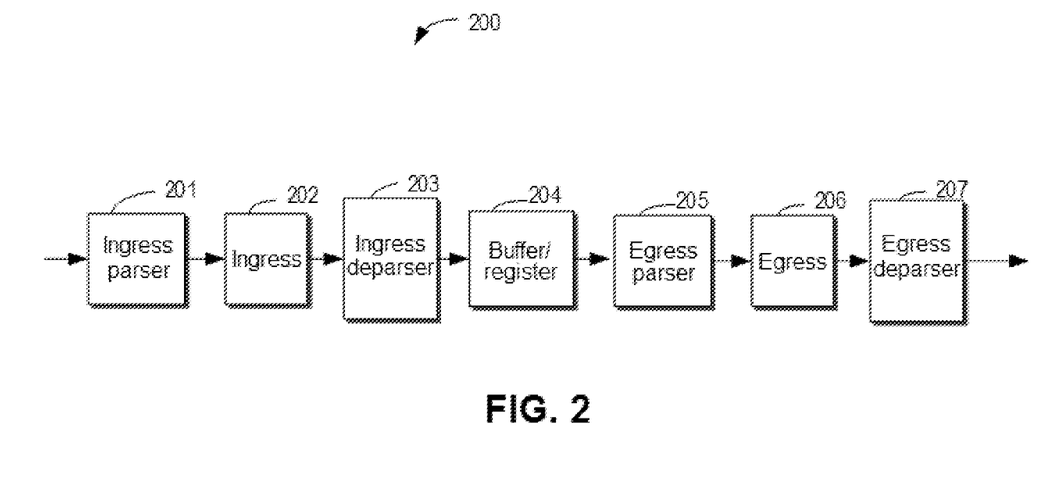
FIG. 2 shows a schematic diagram of the basic architecture of a switch according to the embodiments of the present disclosure.

FIG. 2 shows a schematic diagram of the basic architecture of a switch according to the embodiments of the present disclosure. The switch shown in FIG. 2 may be implemented at first network device 120 or second network device 140 of FIG. 1.

Switch 200 shown in FIG. 2 includes but is not limited to a programmable switch. Unlike conventional switches, the programmable switch can be flexibly reprogrammed with new features and functions that are not limited to network-related functions. Programs of the programmable switch are written in the P4 language and can be updated online onto the programmable switch.

As shown in FIG. 2, switch 200 may comprise an ingress side. The ingress side may comprise, for example, ingress parser 201, ingress 202, and ingress deparser 203. Switch 200 in FIG. 2 may, for example, further comprise an egress side. The egress side may comprise, for example, egress parser 205, egress 206, and egress deparser 207.

If switch 200 is implemented at first network device 120, the ingress side may be used, for example, to receive data packets from a plurality of source devices 110 in FIG. 1 and perform an encapsulation operation on the received data packets.

For the encapsulation operation, the pipeline at the ingress side can successfully aggregate incoming data packets, delete the Ethernet header and store the specified data packets in a register. When the number of accumulated data packets reaches a predetermined threshold value, a large data packet containing small data packets will be generated. Then, the large data packet can be sent out through the egress side.

If switch 200 is implemented at second network device 140, the ingress side may be used, for example, to receive the large data packet from network 130 in FIG. 1 and perform a decapsulation operation on the received large data packet.

For the decapsulation operation, the "resubmitting" and "cloning" mechanisms provided using the P4 language split the large data packet into small data packets. The small data packets will be selected from the large data packet at the ingress side. Then, the small data packets will be constructed in the egress part according to the IP header information thereof, and an Ethernet header will be added. Then, the small data packets will be iteratively sent from the egress side to a plurality of target devices 150.

Specifically, ingress parser 201 may be used, for example, to process an input data packet as an ingress data packet, parse the header of the data packet, and extract the content of the header. Ingress 202 may be used, for example, to further process the ingress data packet according to the extracted content of the header, and change the content of the data packet according to some matching operation tables. Ingress deparser 203 may be used, for example, to use a header and a payload to construct a data packet for further operations.

The processed data packet may be stored in a data packet queue of buffer/register 204.

Egress parser 205 may be used, for example, to process a data packet from buffer/register 204 as an egress data packet, parse the header, and extract the content of the header. Egress 206 may be used, for example, to further process the egress data packet according to the extracted content of the header, and modify the data packet according to some matching action tables. Egress deparser 207 may be used, for example, to use a header and a payload to construct a data packet for output.

Figure 3:
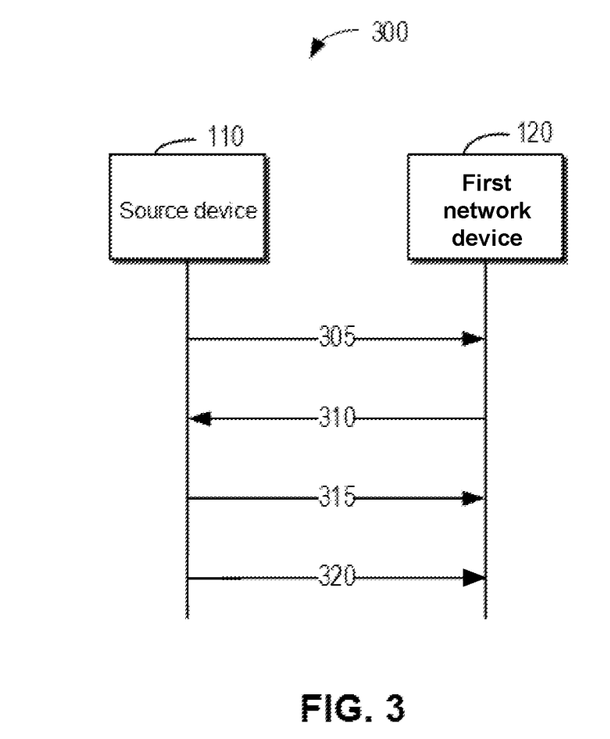
FIG. 3 shows a schematic diagram of the interaction between a first network device and a source device according to the embodiments of the present disclosure.
Figure 4:
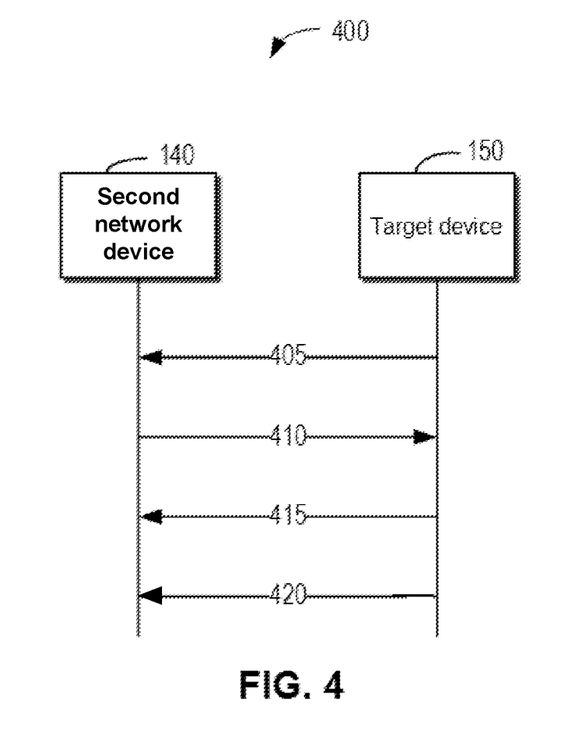
FIG. 4 shows a schematic diagram of the interaction between a second network device and a target device according to the embodiments of the present disclosure.

FIG. 3 shows a schematic diagram 300 of the interaction between a first network device and a source device according to the embodiments of the present disclosure. FIG. 4 shows a schematic diagram 400 of the interaction between a second network device and a target device according to the embodiments of the present disclosure. The data processing and transmission mechanisms are further explained below in conjunction with FIGS. 3 and 4.

As shown in FIG. 3, before source device 110 sends a data packet to first network device 120, source device 110 may enable a function of first network device 120 desired by source device 110 and set parameters for first network device 120 to implement the function.

In some embodiments, source device 110 may send 305 to first network device 120 a serverless list request to query a list of features that a serverless function interface can support. Upon receiving the request, first network device 120 sends 310 to source device 110 a serverless list it can support. If source device 110 determines, from the list provided by first network device 120, that first network device 120 can provide the encapsulation or decapsulation function on the data packet, source device 110 will in turn send 315 to first network device 120 a predetermined parameter for enabling the encapsulation or decapsulation function.

For example, the predetermined parameter may include a rules table that may comprise, for example, a source IP address and a target IP address of the data packet, desired operations on the data packet, and information about a source gateway and/or a target gateway. Based on the rules table, first network device 120 can determine, after receiving the data packet, what operations should be performed on the data packet. Table look-up is a common mechanism of a programmable switch and has a very high execution efficiency. For example, the rules table can be represented by the following table:

TABLE 1

Rules Table Configured for First Network Device 120

| Source IP address | Target IP address | Operations on data packets | Gateway information |
|---|---|---|---|
| Address of source device 110-1 | Address of target device 150-2 | Encapsulation | Address of second network device 140 |
| Address of target device 150-2 | Address of source device 110-1 | Decapsulation | Address of second network device 140 |
| Address of source device 110 | Address of target device 150 | Encapsulation | Address of second network device 140 |
| Address of target device 150 | Address of source device 110 | Decapsulation | Address of second network device 140 |

After configuring parameters for first network device 120, source device 110 may send 320 to first network device 120 information that enables encapsulation or decapsulation.

First network device 120 can then begin to perform an encapsulation operation on small data packets from source device 110 or perform a decapsulation operation on large data packets from second network device 140.

In some embodiments, if first network device 120 receives a data packet, then the information associated with an attribute of the data packet may be determined. The information associated with the attribute of the data packet may comprise a source IP address and a target IP address of the data packet, and corresponding gateway information.

For example, if first network device 120 determines that the source IP address of the data packet is the address of source device 110-1, and the target IP address is the address of target device 150-2, then it can be determined that an encapsulation operation is to be performed on the data packet.

The encapsulation operation may be performed on the data packet at the ingress side of switch 200 shown in FIG. 2, and the encapsulated data packet will be stored in buffer/register 204. When the number of data packets in buffer/register 204 reaches a predetermined number, an extended data packet, i.e., a large data packet, may be constructed using all the data packets in buffer/register 204, which may have a data volume larger than the small data packets. Meanwhile, first network device 120 may assign a target gateway address to the extended data packet based on the rules table, in order to route the extended data packet to another network device to perform the split of the extended data packet. After the split, the other network device can send the data packet to the target device based on the original target IP address of the data packet.

Similarly, as shown in FIG. 4, target device 150 may enable a function of second network device 140 desired thereby and set parameters for second network device 140 to implement the function.

In some embodiments, target device 150 may send 405 to second network device 140 a serverless list request, to query a list of features that a serverless function interface can support. Upon receiving the request, second network device 140 sends 410 to target device 150 a serverless list that it can support. If target device 150 determines, from the list provided by second network device 140, that second network device 140 can provide the encapsulation or decapsulation function on the data packet, target device 150 will in turn send 415 to second network device 140 a predetermined parameter for enabling the encapsulation or decapsulation function.

For example, the predetermined parameter may include a rules table that may comprise, for example, a source IP address and a target IP address of the data packet, desired operations on the data packet, and information about a source gateway and/or a target gateway. Based on the rules table, second network device 140 can determine, after receiving the data packet, what operations should be performed on the data packet. Table look-up is a common mechanism of a programmable switch and has a very high execution efficiency. For example, the rules table can be represented by the following table:

TABLE 2

Rules Table Configured for Second Network Device 140

| Source IP address | Target IP address | Operations on data packets | Gateway information |
|---|---|---|---|
| Address of source device 110-1 | Address of target device 150-2 | Decapsulation | First network device 120 |
| Address of target device 150-2 | Address of source device 110-1 | Encapsulation | First network device 120 |
| Address of source device 110 | Address of target device 150 | Decapsulation | First network device 120 |
| Address of target device 150 | Address of source device 110 | Encapsulation | First network device 120 |

After configuring parameters for second network device 140, target device 150 may send 420 to second network device 140 information that enables encapsulation or decapsulation.

Second network device 140 can then begin to perform a decapsulation operation on extended data packets from the network or perform an encapsulation operation on small data packets from target device 150.

In some embodiments, if second network device 140 receives an extended data packet, then the information associated with an attribute of the extended data packet may be determined. The information associated with the attribute of the data packet may comprise a source IP address and a target IP address of the data packet, and corresponding gateway information.

For example, if first network device 120 determines that the source IP address of the extended data packet is the address of source device 110-1, and the target IP address is the address of target device 150-2, then it can be determined that a decapsulation operation is to be performed on the data packet.

The decapsulation operation may be performed on the data packet at the ingress side of switch 200 shown in FIG. 2, and the decapsulated data packet can be stored in buffer/register 204. When the number of decapsulated data packets in buffer/register 204 reaches a predetermined number, it is possible to further acquire the source IP target address of the data packets and send the data packets to the corresponding target device.

In addition, a resubmitting mechanism may be introduced for a decompression operation. With this mechanism, after a small data packet is extracted from the extended data packet, a data packet cloning mechanism sends the small data packet to the egress side. At this time, a plurality of data packets still exist in the extended data packet. It is possible to resubmit the extended data packet to the ingress side of switch 200, then further extract a small data packet, and repeat the cloning process. In this manner, all the extracted small data packets are sent from the egress side of switch 200 to the target device.

In this manner, by using advantages of programmable switches, encapsulation and decapsulation operations are introduced for communications between edge Internet of Things network devices and data center applications, which can significantly increase the throughput.

Figure 5:
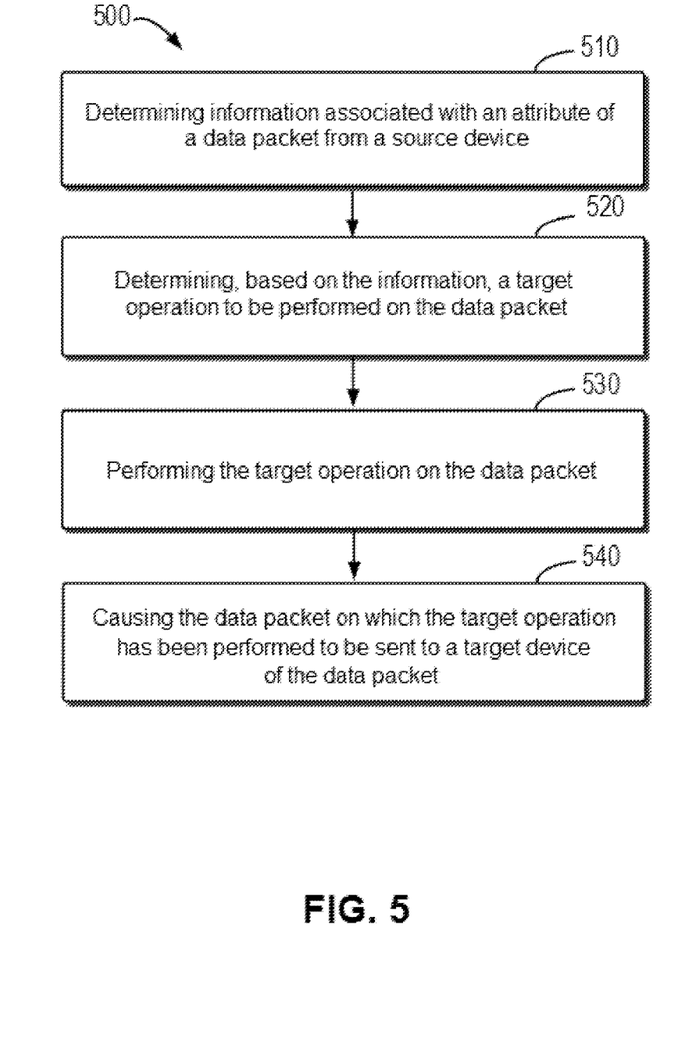
FIG. 5 shows a flowchart of a method for data processing according to the embodiments of the present disclosure.

FIG. 5 shows a flowchart of method 500 for task processing according to some embodiments of the present disclosure. Method 500 may be implemented at first network device 120 or second network device 140 shown in FIG. 1.

At block 510, a network device determines information associated with an attribute of a data packet from a source device.

In some embodiments, the network device may determine a source address of the data packet, a type of the data packet, a target address of the data packet, a source gateway of the data packet, or a target gateway of the data packet.

At block 520, the network device determines, based on the information, a target operation to be performed on the data packet.

In some embodiments, the target operation comprises performing an encapsulation operation on the data packet or performing a decapsulation operation on the data packet.

In some embodiments, the network device may acquire an association relationship between the attribute and the target operation and determine the target operation based on the association relationship and the information associated with the attribute.

At block 530, the network device performs the target operation on the data packet.

In some embodiments, the network device may store the data packet in a buffer in response to determining that an encapsulation operation is to be performed on the data packet; and construct, in response to determining that the number of data packets stored in the buffer exceeds a threshold number, an extended data packet using the data packet and the number of packets in the buffer other than the data packet, wherein the extended data packet has a data volume greater than the data packet and has a corresponding target address.

In some embodiments, the network device may extract an encapsulated data packet from the data packet in response to determining that a decapsulation operation is to be performed on the data packet.

At block 540, the network device causes the data packet on which the target operation has been performed to be sent to a target device of the data packet.

In some embodiments, the network device may cause, based on an extended target address assigned to the extended data packet when constructing the extended data packet, the extended data packet to be sent to a network device corresponding to the target address, wherein the network device extracts the data packet from the extended data packet and sends the data packet to the target device based on a target address corresponding to the data packet.

In some embodiments, the network device may acquire a target address of the encapsulated data packet from the header of the encapsulated data packet; and cause the encapsulated data packet to be sent to a target device corresponding to the target address of the encapsulated data packet.

Figure 6:
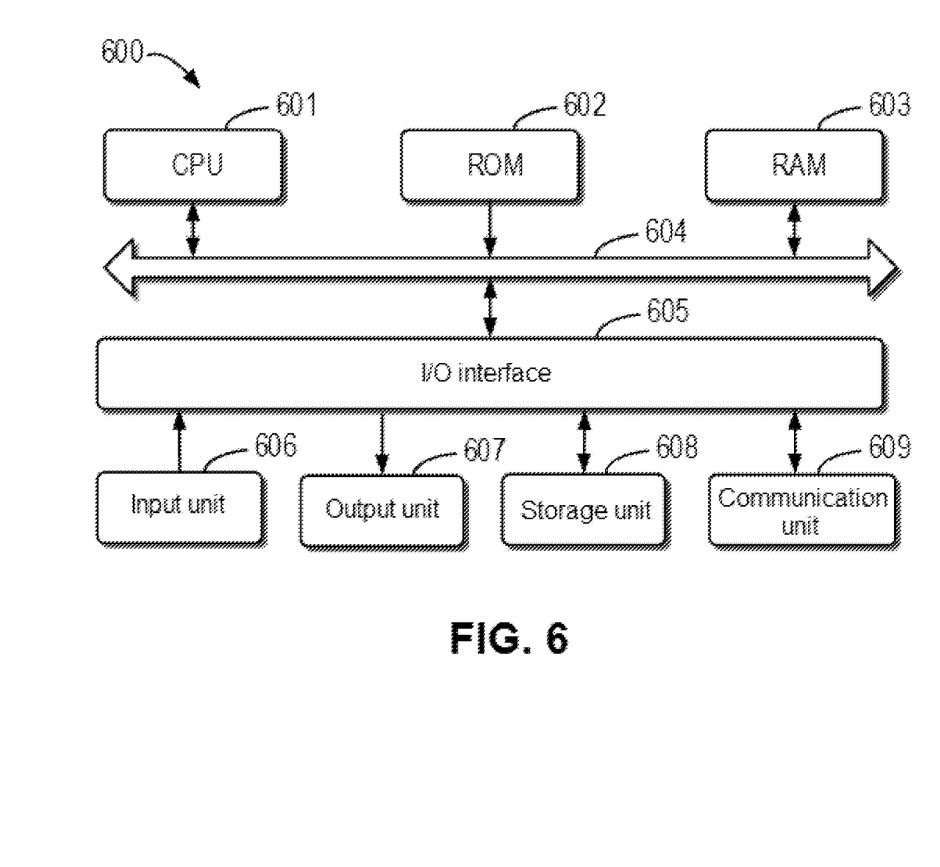
FIG. 6 shows a block diagram of an example device that can be used to implement the embodiments of the present disclosure.

FIG. 6 shows a schematic block diagram of example device 600 that can be used to implement the embodiments of the present disclosure. For example, a given device 110 as shown in FIG. 1 may be implemented by device 600. As shown in the figure, device 600 includes central processing unit (CPU) 601 that can perform various appropriate actions and processing according to computer program instructions stored in read-only memory (ROM) 602 or computer program instructions loaded from storage unit 608 to random access memory (RAM) 603. Various programs and data required for the operation of unit 600 can also be stored in RAM 603. CPU 601, ROM 602 and RAM 603 are connected to each other through bus 604. Input/Output (I/O) interface 605 is also connected to bus 604.

A plurality of components in device 600 are connected to I/O interface 605, including: input unit 606, such as a physical keyboard and a mouse; output unit 607, such as various types of displays and speakers; storage unit 608, such as a physical magnetic disk and a physical optical disc; and communication unit 609, such as a network card, a modem, and a wireless communication transceiver. Communication unit 609 allows device 600 to exchange information/data with other devices over a computer network such as the Internet and/or various telecommunication networks.

The various processes and processing described above, for example, method 500, may be performed by CPU 601. For example, in some embodiments, method 500 can be implemented as a computer software program that is tangibly included in a machine-readable medium such as storage unit 608. In some embodiments, some or all of the computer programs can be loaded and/or installed onto device 600 via ROM 602 and/or communication unit 609. When the computer program is loaded into RAM 603 and executed by CPU 601, one or more steps of method 500 described above may be performed.

Embodiments of the present disclosure include a method, an apparatus, a system, and/or a computer program product. The computer program product may include a computer-readable storage medium storing computer-readable program instructions for performing various aspects of the present disclosure.

The computer-readable storage medium may be a tangible device capable of retaining and storing instructions used by an instruction-executing device. For example, the computer-readable storage medium may be, but is not limited to, an electrical storage unit, a magnetic storage unit, an optical storage unit, an electromagnetic storage unit, a semiconductor storage unit, or any appropriate combination of the above. More specific examples (a non-exhaustive list) of the computer-readable storage medium include: a portable physical computer disk, a physical hard disk, RAM, ROM, an erasable programmable read-only memory (EPROM or flash memory), a static random access memory (SRAM), a portable physical compact disk read-only memory (CD-ROM), a physical digital versatile disk (DVD), a memory stick, a physical floppy disk, a mechanical encoding device such as a punch card or protrusions in a groove on which instructions are stored, and any appropriate combination of the above. The computer-readable storage medium as used here is not explained as transient signals themselves, such as radio waves or other electromagnetic waves propagated freely, electromagnetic waves propagated through waveguides or other transmission media (e.g., light pulses propagated through fiber-optic cables), or electrical signals transmitted over electrical wires.

The computer-readable program instructions described here may be downloaded from the computer-readable storage medium to various computing/processing devices or downloaded to external computers or external storage units over a network such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in the computer-readable storage medium in each computing/processing device.

The computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, including object oriented programming languages such as Smalltalk and C++, as well as conventional procedural programming languages such as the "C" language or similar programming languages. The computer-readable program instructions may be executed completely on a user's computer, partially on a user's computer, as a separate software package, partially on a user's computer and partially on a remote computer, or completely on a remote computer or server. In the case where a remote computer is involved, the remote computer can be connected to a user computer over any kind of network, including a local area network (LAN) or wide area network (WAN), or can be connected to an external computer (e.g., connected over the Internet using an Internet service provider). In some embodiments, an electronic circuit, such as a programmable logic circuit, a field programmable gate array (FPGA), or a programmable logic array (PLA), can be customized by utilizing state information of the computer-readable program instructions. The electronic circuit can execute the computer-readable program instructions to implement various aspects of the present disclosure.

Various aspects of the present disclosure are described herein with reference to flowcharts and/or block diagrams of the method, the apparatus (system), and the computer program product according to the embodiments of the present disclosure. It should be appreciated that each block in the flowcharts and/or block diagrams and a combination of blocks in the flowcharts and/or block diagrams can be implemented by computer-readable program instructions.

The computer-readable program instructions can be provided to a processing unit of a general purpose computer, a special purpose computer, or another programmable data processing apparatus to produce a machine, such that the instructions, when executed by the processing unit of the computer or another programmable data processing apparatus, generate an apparatus for implementing the functions/actions specified in one or more blocks in the flowcharts and/or block diagrams. The computer-readable program instructions may also be stored in a computer-readable storage medium, and the instructions cause the computer, another programmable data processing apparatus, and/or another device to work in a specific manner, such that the computer-readable medium storing the instructions includes an article of manufacture including instructions for implementing various aspects of functions/actions specified by one or more blocks in the flowcharts and/or block diagrams.

The computer-readable program instructions may also be loaded onto a computer, another programmable data processing apparatus, or another device, such that a series of operational steps are performed on the computer, another programmable data processing apparatus, or another device to produce a computer implemented process. As such, the instructions executed on the computer, another programmable data processing apparatus, or another device implement the functions/actions specified in one or more blocks in the flowcharts and/or block diagrams.

The flowcharts and block diagrams in the accompanying drawings illustrate the architectures, functions, and operations of possible implementations of systems, methods, and computer program products according to multiple embodiments of the present disclosure. In this regard, each block in the flowcharts or block diagrams can represent a module, a program segment, or a portion of an instruction that includes one or more executable instructions for implementing the specified logical functions. In some alternative implementations, functions labeled in the blocks may occur in an order different from that as labeled in the accompanying drawings. For example, two successive blocks may actually be performed basically in parallel, or they can be performed in an opposite order sometimes, depending on the functions involved. It also should be noted that each block in the block diagrams and/or flowcharts and a combination of blocks in the block diagrams and/or flowcharts can be implemented using a dedicated hardware-based system for executing specified functions or actions, or can be implemented using a combination of dedicated hardware and computer instructions.

Various embodiments of the present disclosure have been described above. The foregoing description is illustrative rather than exhaustive, and is not limited to the disclosed embodiments. Numerous modifications and changes are apparent to those of ordinary skill in the art without departing from the scope and spirit of the various illustrated embodiments. The selection of terms as used herein is intended to best explain the principles and practical applications of the various embodiments or technical improvements of technologies on the market, and to otherwise enable those of ordinary skill in the art to understand the embodiments disclosed here.

What is claimed is:

1. A method for data processing, comprising:
   determining information associated with an attribute of a data packet from a source device;
   determining, based on the information, a target operation to be performed on the data packet;
   performing the target operation on the data packet; and
   causing the data packet on which the target operation has been performed to be sent to a target device of the data packet;
   wherein performing the target operation on the data packet comprises:
   determining that an encapsulation operation is to be performed on the data packet;
   performing the encapsulation operation on the data packet;
   storing the encapsulated data packet in a buffer with one or more other data packets; and
   in response to determining that the number of data packets stored in the buffer exceeds a threshold number, generating an extended data packet using the encapsulated data packet and at least a subset of the other data packets in the buffer, wherein the extended data packet has a data volume greater than the encapsulated data packet and has a corresponding extended target address; and wherein causing the data packet to be sent comprises:
causing, based on the extended target address of the extended data packet, the extended data packet to be sent to a network device corresponding to the extended target address of the extended data packet, wherein the network device extracts the data packet from the extended data packet and sends the data packet to the target device based on a target address of the data packet.

2. The method according to claim 1, wherein determining information associated with the attribute of the data packet comprises determining at least one of the following:
a source address of the data packet,
a target address of the data packet,
a type of the data packet,
a source gateway of the data packet, and
a target gateway of the data packet.

3. The method according to claim 1, wherein the method further comprises performing a decapsulation operation on the encapsulated data packet.

4. The method according to claim 1, wherein determining the target operation to be performed on the data packet comprises:
acquiring an association relationship between the attribute and the target operation; and
determining the target operation based on the association relationship and the information associated with the attribute.

5. The method according to claim 1, wherein the method further comprises:
determining that a decapsulation operation is to be performed on the encapsulated data packet; and
performing the decapsulation operation on the encapsulated data packet.

6. The method according to claim 1, wherein causing the data packet to be sent comprises:
acquiring a target address of the encapsulated data packet from a header of the encapsulated data packet; and
causing the encapsulated data packet to be sent to a target device corresponding to the target address of the encapsulated data packet.

7. An electronic device, comprising:
a processor; and
a memory coupled with the processor and storing instructions for execution by the processor, wherein the instructions, when executed by the processor, cause the electronic device to perform actions, the actions comprising:
determining information associated with an attribute of a data packet from a source device;
determining, based on the information, a target operation to be performed on the data packet;
performing the target operation on the data packet; and
causing the data packet on which the target operation has been performed to be sent to a target device of the data packet;
wherein performing the target operation on the data packet comprises:
determining that an encapsulation operation is to be performed on the data packet;
performing the encapsulation operation on the data packet;
storing the encapsulated data packet in a buffer with one or more other data packets; and
in response to determining that the number of data packets stored in the buffer exceeds a threshold number, generating an extended data packet using the encapsulated data packet and at least a subset of the other data packets in the buffer, wherein the extended data packet has a data volume greater than the encapsulated data packet and has a corresponding extended target address; and wherein causing the data packet to be sent comprises:
causing, based on the extended target address of the extended data packet, the extended data packet to be sent to a network device corresponding to the extended target address of the extended data packet, wherein the network device extracts the data packet from the extended data packet and sends the data packet to the target device based on a target address of the data packet.

8. The device according to claim 7, wherein determining information associated with the attribute of the data packet comprises determining at least one of the following:
a source address of the data packet,
a target address of the data packet,
a type of the data packet,
a source gateway of the data packet, and
a target gateway of the data packet.

9. The device according to claim 7, wherein the actions further comprise performing a decapsulation operation on the encapsulated data packet.

10. The device according to claim 7, wherein determining the target operation to be performed on the data packet comprises:
acquiring an association relationship between the attribute and the target operation; and
determining the target operation based on the association relationship and the information associated with the attribute.

11. The device according to claim 7, wherein the actions further comprise:
determining that a decapsulation operation is to be performed on the encapsulated data packet; and
performing the decapsulation operation on the encapsulated data packet.

12. The device according to claim 7, wherein causing the data packet to be sent comprises:
acquiring a target address of the encapsulated data packet from a header of the encapsulated data packet; and
causing the encapsulated data packet to be sent to a target device corresponding to the target address of the encapsulated data packet.

13. The device according to claim 7, wherein the network device comprises a programmable switch.

14. A computer program product that is tangibly stored on a non-transitory computer-readable medium and contains machine-executable instructions, wherein the machine-executable instructions, when executed, cause a machine to perform steps of a method for data processing, comprising:
determining information associated with an attribute of a data packet from a source device;
determining, based on the information, a target operation to be performed on the data packet;
performing the target operation on the data packet; and
causing the data packet on which the target operation has been performed to be sent to a target device of the data packet;

wherein performing the target operation on the data packet comprises:
  determining that an encapsulation operation is to be performed on the data packet;
  performing the encapsulation operation on the data packet;
  storing the encapsulated data packet in a buffer with one or more other data packets; and
  in response to determining that the number of data packets stored in the buffer exceeds a threshold number, generating an extended data packet using the encapsulated data packet and at least a subset of the other data packets in the buffer, wherein the extended data packet has a data volume greater than the encapsulated data packet and has a corresponding extended target address; and
wherein causing the data packet to be sent comprises:
  causing, based on the extended target address of the extended data packet, the extended data packet to be sent to a network device corresponding to the extended target address of the extended data packet, wherein the network device extracts the data packet from the extended data packet and sends the data packet to the target device based on a target address of the data packet.

15. The computer program product according to claim 14, wherein determining information associated with the attribute of the data packet comprises determining at least one of the following:
  a source address of the data packet,
  a target address of the data packet,
  a type of the data packet,
  a source gateway of the data packet, and
  a target gateway of the data packet.

16. The computer program product according to claim 14, wherein the steps of the method further comprise performing a decapsulation operation on the encapsulated data packet.

17. The computer program product according to claim 14, wherein determining the target operation to be performed on the data packet comprises:
  acquiring an association relationship between the attribute and the target operation; and
  determining the target operation based on the association relationship and the information associated with the attribute.

18. The computer program product according to claim 14, wherein the steps of the method further comprise:
  determining that a decapsulation operation is to be performed on the encapsulated data packet; and
  performing the decapsulation operation on the encapsulated data packet.

19. The computer program product according to claim 14, wherein causing the data packet to be sent comprises:
  acquiring a target address of the encapsulated data packet from a header of the encapsulated data packet; and
  causing the encapsulated data packet to be sent to a target device corresponding to the target address of the encapsulated data packet.

20. The computer program product according to claim 14, wherein the network device comprises a programmable switch.

* * * * *